(12) United States Patent
Aanonsen et al.

(10) Patent No.: US 6,948,696 B1
(45) Date of Patent: Sep. 27, 2005

(54) PINCH VALVES

(75) Inventors: Lloyd B. Aanonsen, Old Tappan, NJ (US); Richard J. DiGiovanni, Englewood, NJ (US)

(73) Assignee: General Rubber Corporation, South Hackensack, NJ (US)

(*) Notice: Subject to any disclaimer, the term of this patent is extended or adjusted under 35 U.S.C. 154(b) by 82 days.

(21) Appl. No.: 10/701,643

(22) Filed: Nov. 5, 2003

(51) Int. Cl.[7] .............................................. F16K 31/00
(52) U.S. Cl. .................... 251/4; 251/5; 251/7
(58) Field of Search ................... 251/4, 5, 7

(56) References Cited

U.S. PATENT DOCUMENTS

| | | | |
|---|---|---|---|
| 2,467,150 A | 4/1949 | Nordell | |
| 2,573,712 A | 11/1951 | Kallam | |
| 2,693,223 A | 11/1954 | Krupp | |
| 2,842,331 A | 7/1958 | Anderson | |
| 3,070,130 A | 12/1962 | Risley | |
| 3,197,173 A | 7/1965 | Taubenheim | |
| 3,350,053 A | 10/1967 | Schmitz | |
| 3,552,712 A | 1/1971 | Whitlock | |
| 3,826,461 A | 7/1974 | Summerfield et al. | |
| 3,965,925 A | 6/1976 | Gooch | |
| 4,092,010 A | 5/1978 | Carlson, Jr. | |
| 4,108,418 A | 8/1978 | Ensign et al. | |
| 4,111,391 A | 9/1978 | Pilolla | |
| 4,191,358 A | 3/1980 | Ferri | |
| 4,372,528 A | 2/1983 | Raftis | |
| 4,451,023 A | 5/1984 | Zakai | |
| 4,494,345 A * | 1/1985 | Peterson | 137/414 |
| 5,207,409 A | 5/1993 | Riikonen | |
| 5,535,983 A | 7/1996 | Hohermuth | |
| 6,102,361 A | 8/2000 | Riikonen | |

* cited by examiner

Primary Examiner—J. Casimer Jacyna
(74) Attorney, Agent, or Firm—Arthur Jacob

(57) ABSTRACT

A pinch valve has a resiliently flexible tubular valve member folded upon itself at an intermediate portion of the length of the valve member to establish a folded configuration including a longitudinally extending folded portion, preferably in the form of folds, and an operator for selectively exerting a lateral force upon the valve member to unfold the folded portion, or folds, so as to restrict the flow of fluid through the valve member by closing down the valve member. Upon release of the lateral force, biasing forces established by memory characteristics in the construction of the valve member return the valve member to the folded configuration to open the valve member for unrestricted flow of the fluid.

28 Claims, 5 Drawing Sheets

PINCH VALVES

BACKGROUND OF THE INVENTION

1. Field of the Invention

The present invention relates generally to pinch valves and pertains, more specifically, to improvements providing pinch valves with better performance and greater versatility, enabling effective employment within a wider range of installations, including installations previously not amenable to the use of pinch valves.

Pinch valves have found widespread use wherever it is desired to restrict the flow of fluids in a fluid conducting system. The simplicity of utilizing a flexible tubular valve member which is pinched to restrict the flow of fluids has created a demand for ever more versatile pinch valves adapted for installation in a wider variety of systems.

A primary drawback of current pinch valve constructions is the necessity for providing the flexible tubular valve member of such pinch valves with a length sufficient to enable closing of the valve without imparting undue tensile stresses to the wall of the valve member. As a result, the overall length of a pinch valve suitable for effective operation in a particular fluid conducting system ordinarily has been greater than the overall length of another valve type which can serve in the same system. Accordingly, many systems which require the use of a more compact valve construction have not been amenable to the use of pinch valves.

2. Description of the Related Prior Art

In an effort to reduce the overall length of a pinch valve, while providing the valve member of the pinch valve with the ability to be pinched closed without excessive tensile stresses in the wall of the valve member, various valve member configurations have been suggested for making available an increased length in the wall of the valve member while minimizing the overall length of the valve itself. Thus, pinch valves have been constructed with flexible tubular valve members in the form of sleeves having arched sections, domed sections and other configurations aimed at supplying an increased length in the wall of the tubular member without a concomitant increase in the overall longitudinal length of the pinch valve itself. However, while some of these current constructions accomplish the above-outlined basic objective, many introduce other undesirable characteristics, such as undue turbulence in the flow of fluids through an open valve, and significantly increased dimensions in transverse directions.

BRIEF SUMMARY OF THE INVENTION

The present invention provides a pinch valve construction which avoids the drawbacks set forth above, while accomplishing several objects and advantages, some of which are summarized as follows: Provides a pinch valve with a flexible tubular valve member having an effective wall length sufficient to enable closing of the valve member without introducing excessive tensile stresses into the wall of the valve member, while maintaining a minimal overall longitudinal length in the pinch valve itself; accomplishes the provision of sufficient length in a flexible tubular valve member of a pinch valve without introducing excessive turbulence in the flow of fluid through an open pinch valve; minimizes tensile stresses in the valve member of a pinch valve during operation to restrict flow through the valve member; enhances the ability to operate a pinch valve utilizing any one of a variety of valve operating mechanisms; provides a pinch valve with highly compact dimensions, both in longitudinal and lateral directions, enabling installation in systems having more severe size limitations; allows increased versatility and economy for the incorporation of pinch valves into systems heretofore not amenable to the employment of a pinch valve; enables the manufacture of a wide range of highly versatile pinch valves with increased economy; provides pinch valves having a rugged construction capable of exemplary performance over a relatively long service life.

The above objects and advantages, as well as further objects and advantages, are attained by the present invention which may be described briefly as a pinch valve comprising: a valve casing extending longitudinally between opposite ends; a flexible tubular valve member within the valve casing, the valve member extending longitudinally between opposite ends such that each of the opposite ends of the valve member is juxtaposed with a corresponding opposite end of the casing; the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent, and the wall extending circumferentially around the lateral extent of the passage; at least one fold in the wall of the valve member, the fold, when in a folded configuration, extending along the tubular valve member in an essentially longitudinal direction so as to overlie the wall and have a prescribed longitudinal extent; and a valve operator for selectively exerting a lateral force upon the wall of the valve member to unfold the at least one fold and move the wall laterally, the relative dimensions of the longitudinal extent of the fold and the lateral extent of the passage enabling the unfolding of the at least one fold and the lateral movement of the wall to restrict the flow of fluid from one end to the other end of the valve member with only minimum forces upon the valve member in directions tending to establish tensile stresses in the valve member.

In addition, the present invention provides a pinch valve comprising: a valve casing extending longitudinally between opposite ends; a flexible tubular valve member within the valve casing, the valve member extending longitudinally between opposite ends such that each of the opposite ends of the valve member is juxtaposed with a corresponding opposite end of the casing; the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage; the valve member being folded essentially longitudinally upon itself to establish at least one folded portion having a longitudinal extent along the intermediate wall portion; and a valve operator for selectively exerting a lateral force upon the wall of the valve member to unfold the folded portion of the valve member and move the wall laterally, the relative dimensions of the longitudinal extent of the folded portion and the lateral extent of the passage enabling the unfolding of the valve member and the lateral movement of the wall to restrict the flow of fluid from one end to the other end of the valve member with only minimal forces upon the valve member in directions tending to establish tensile stresses in the wall of the valve member.

BRIEF DESCRIPTION OF THE SEVERAL VIEWS OF THE DRAWING

The present invention will be understood more fully, while still further objects and advantages will become apparent, in the following detailed description of preferred embodiments of tine invention illustrated in the accompanying drawing, in which.

DETAILED DESCRIPTION OF THE INVENTION

Figure 1:
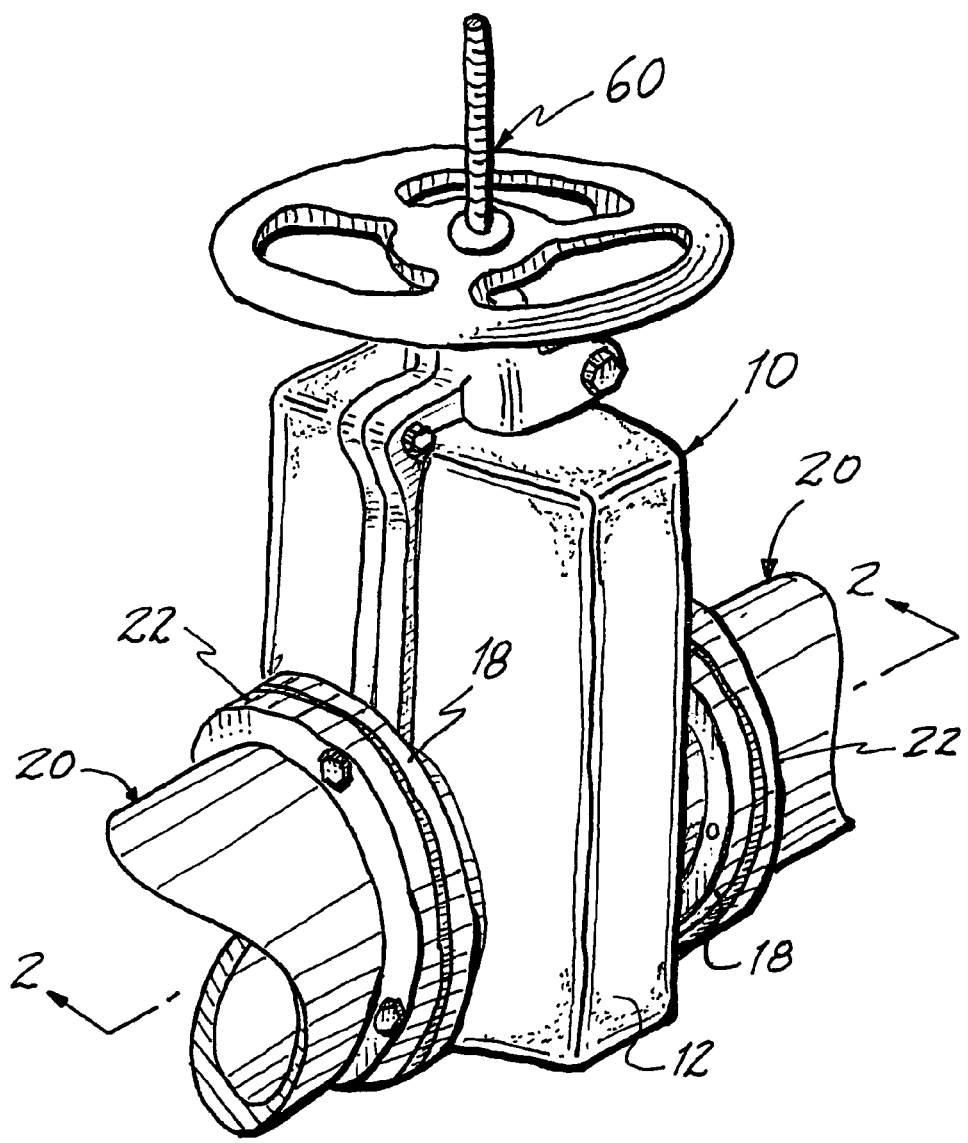
FIG. 1 is a pictorial perspective view of a pinch valve constructed in accordance with the present invention, installed within a fluid-conducting system.
Figure 2:
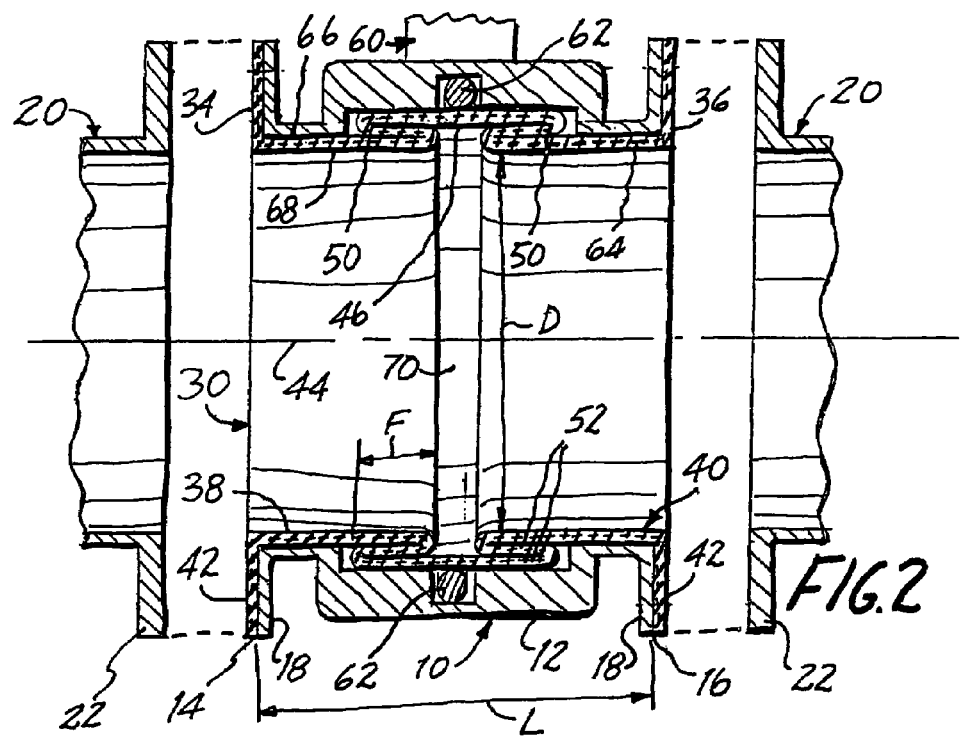
FIG. 2 is an enlarged, partially diagrammatic, partly exploded fragmentary longitudinal cross-sectional view taken along line 2—2 of FIG. 1, with the pinch valve shown in an open configuration.
Figure 3:
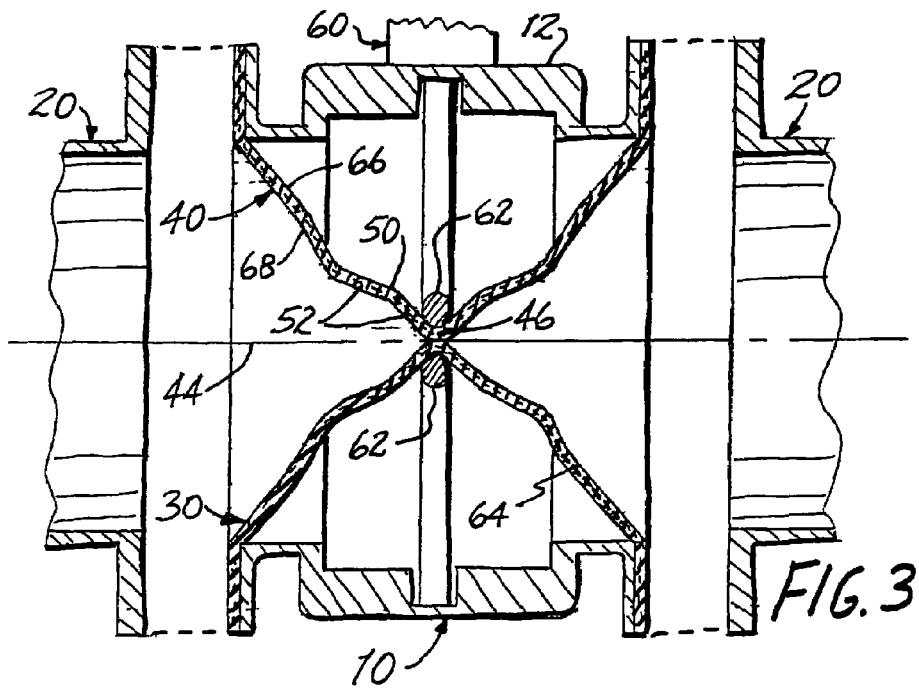
FIG. 3 is a view similar to FIG. 2, but with the pinch valve shown in a closed configuration.

Referring now to the drawing, and especially to FIGS. 1 through 3 thereof, a pinch valve constructed in accordance with the present invention is shown at 10 and is seen to include an outer valve casing 12 extending longitudinally between a first end 14 and a longitudinally opposite second end 16. Casing 12 includes an overall length L and has a flange 18 at each end 14 and 16 for installing pinch valve 10 within a fluid conducting system 20 by connecting each flange 18 to a corresponding flange 22 of the system 20, in a now well-known manner.

A flexible tubular valve member 30 is placed within casing 32 and extends longitudinally between opposite ends 34 and 36 such that end 34 is juxtaposed with end 14 of the casing 12 and end 36 is juxtaposed with end 16 of the casing 12. An internal passage 38 extends from one end 34 to the other end 36 of the valve member 30 for conducting fluid from one to the other of the opposite ends 34 and 36 of the valve member 30, and valve member 30 includes a wall 40 extending longitudinally between the opposite ends 34 and 36 and circumferentially around the passage 38. As is known in pinch valves, valve member 30 is constructed of a resiliently flexible material, such as an elastomer, for purposes to be described in detail below. Wall 40 is largely cylindrical, extends longitudinally along a central longitudinal axis 44, and includes an annular flange 42 at each end for being interposed between corresponding juxtaposed flanges 18 and 22 to serve as seals when pinch valve 10 is installed within system 20.

Wall 40 includes a wall portion 46 located intermediate the ends 34 and 36 of the valve member 30, and the valve member 30 is folded upon itself along the intermediate wall portion 46 to establish folded portions, shown in the form of folds 50 extending along the intermediate wall portion 46. Wall portion 46 extends circumferentially around the passage 38 and surrounds passage 38, the passage 38 having a prescribed lateral extent, shown in the form of a given diameter D, which is surrounded by wall portion 46. Folds 50, when in the folded configuration depicted in FIG. 2, extend along the valve member 30 in a longitudinal direction, essentially parallel to longitudinal axis 44, so as to overlie the intermediate wall portion 46, juxtaposed with the intermediate wall portion 46 in close proximity therewith, and preferably contiguous therewith, in order to minimize the overall diameter of the folded portions of the valve member 30. Thus, in the preferred construction illustrated in FIG. 2, each fold 50 has a prescribed longitudinal extent, shown in the form of length F, and includes legs 52 extending essentially parallel to longitudinal axis 44 and overlying one another, with adjacent legs 52 being essentially contiguous.

Upon selective operation of pinch valve 10 to restrict the flow of fluid through passage 38 of the valve member 30, an actuator, illustrated in the form of a manually-operated screw-jack mechanism 60, is operated to move a valve operator in the form of transverse bars 62 toward one another, from the position illustrated in FIG. 2, wherein the valve member 30 is depicted in an open configuration, to the position shown in FIG. 3, thereby exerting lateral forces upon the wall 40 of the valve member 30, at the intermediate wall portion 46, to unfold the folds 50, as seen in FIG. 3, and move the intermediate wall portion 46 laterally toward closing of the passage 38. The relative dimensions of the length F of folds 50 and the diameter D of the passage 38 are such that the force required to close passage 38, as illustrated by the closed configuration of valve member 30 depicted in FIG. 3, establishes only minimal forces in the valve member 30 In directions tending to draw the opposite ends 34 an 36 of the valve member 30 toward one another, and consequently minimizes tensile stresses within the wall 40 of the valve member 30. The employment of folds 50 thus enables the overall length L of casing 12 and, concomitantly, the overall length of pinch valve 10, to be reduced without introducing excessive tensile stresses in the valve member 30 upon operation of the valve member 30, even with a relatively high ratio of diameter D to length L. Hence, the construction of pinch valve 10 enables pinch valves to be provided in a very wide range of sizes, including pinch valves of relatively compact length, as well as compact diameter, capable of installation in systems heretofore not amenable to the employment of a pinch valve because of space limitations.

Upon selective opening of pinch valve 10, actuation of the transverse bars 62 is reversed to withdraw the bars 62 away from one another, to move the bars 62 from the position illustrated in FIG. 3 to the position shown in FIG. 2. Memory characteristics provided by the resiliently flexible material of valve member 30 establishes biasing forces which then return the valve member 30 to the folded configuration illustrated in FIG. 2. In the embodiment illustrated in FIGS. 2 and 3, valve member 30 is molded of an elastomeric material, such as natural or synthetic rubber, preferably reinforced with one or more webs 64 constructed of a textile mesh, providing the requisite strength and flexibility characteristics, as well as the memory characteristics described above.

Valve member 30 includes an outer surface 66 confronting casing 12, and an inner surface 68 contiguous with passage 36. In the embodiment of FIGS. 2 and 3, the folds 50 are essentially contiguous with the outer surface 66 of the valve member 30 so as to maintain a relatively compact overall diameter in casing 12. The folds 50 are arranged serially along the intermediate wall portion 46 of valve member 30 and, although spaced longitudinally from one another to facilitate operation of the transverse bars 62, the gap 70 between adjacent folds 50 is relatively small, both in length and depth, so that the inner surface 68 is maintained essentially free of any interruption which could cause undue turbulence in the flow of fluid through the passage 38. Thus, passage 38 provides an essentially axial path for the flow of fluid through pinch valve 10, uninterrupted by deviations in the configuration of the passage which could cause turbulence or other resistance to unimpeded flow.

Figure 4:
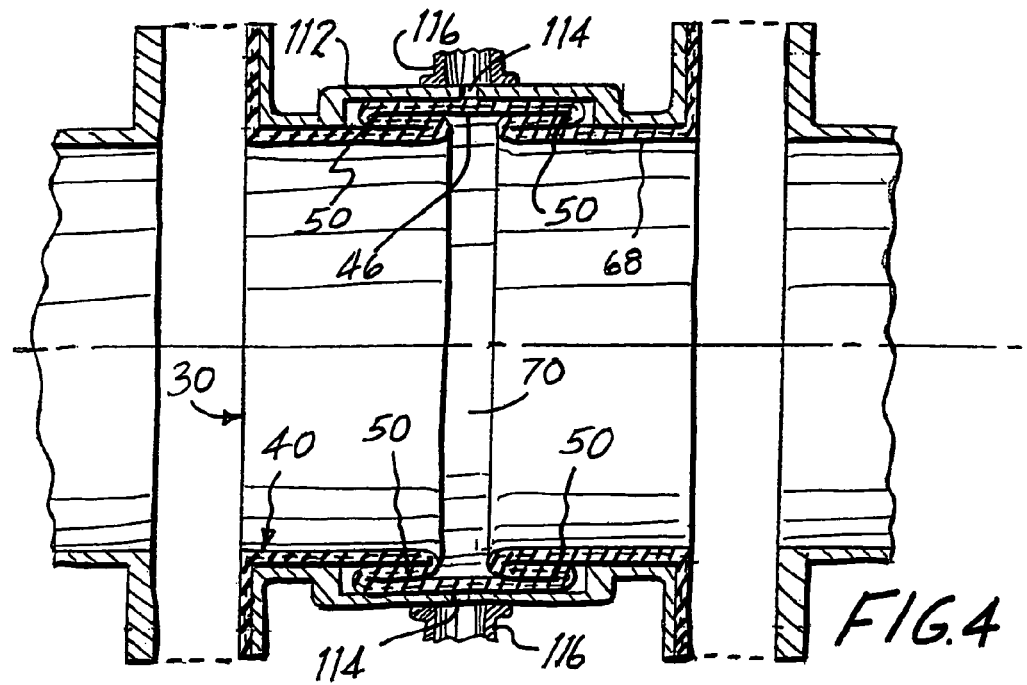
FIG. 4 is a view similar to FIG. 2 and showing another pinch valve constructed in accordance with the present invention, in an open configuration.
Figure 5:
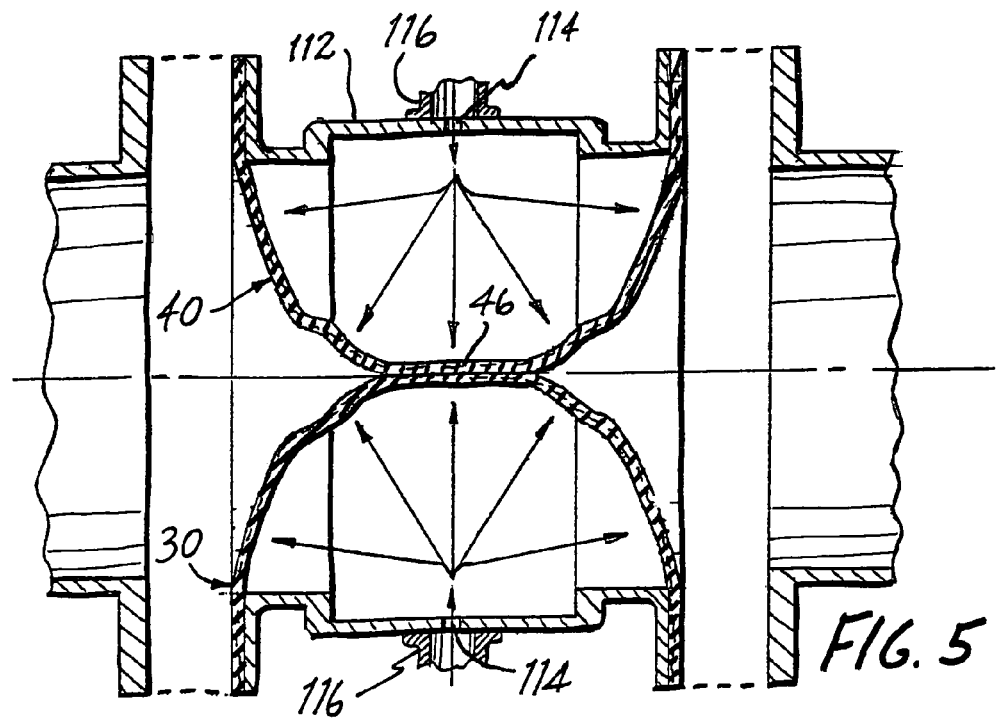
FIG. 5 is a view similar to FIG. 4, but with the pinch valve shown in a closed configuration.

Turning now to the embodiment illustrated in FIGS. 4 and 5, valve member 30 remains the same as that described above in connection with FIGS. 2 and 3; however, casing 12 has been replaced by casing 112 which includes ports 114 located in juxtaposition with intermediate wall portion 46. A valve operator 116 selectively provides fluid under pressure to the ports 114, the preferred fluid being air under pressure, to exert forces on the valve member 30, as indicated by the arrows in FIG. 5, for unfolding folds 50 and moving the wall 40 of the valve member 10 from the open configuration shown in FIG. 4 to the closed configuration illustrated in FIG. 5. Upon release of the air pressure, the valve member 30 will return to the open configuration illustrated in FIG. 4.

Figure 6:
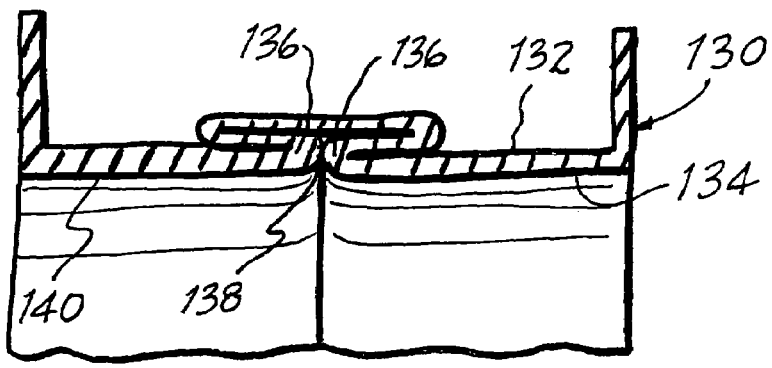
FIG. 6 is a fragmentary longitudinal cross-sectional view of a component part of a pinch valve constructed in accordance with the present invention, showing an alternate construction.

In the embodiment illustrated in FIG. 6, an alternate valve member 130 having an outer surface 132 and an inner surface 134 is provided with folds 136 placed serially along the valve member 130 and overlying the outer surface 132, essentially contiguous with the outer surface 132, with the serial folds 136 essentially contiguous with one another at 138, thereby further reducing any interruption which could cause turbulence or otherwise impede the flow of fluid through the passage 140 of valve member 130.

Figure 7:
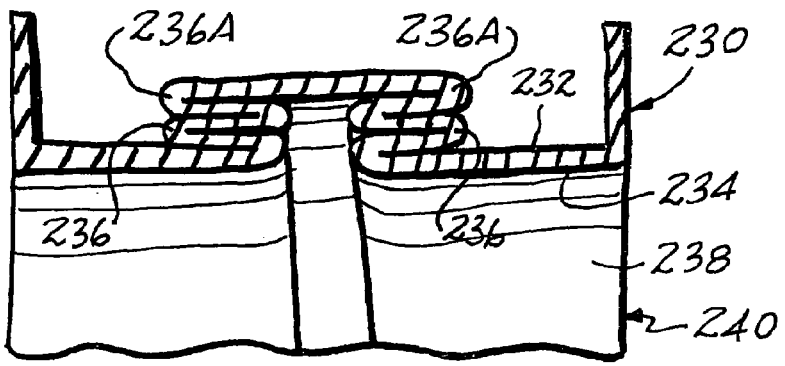
FIG. 7 is a fragmentary longitudinal cross-sectional view of the component part, showing another alternate construction.
Figure 8:
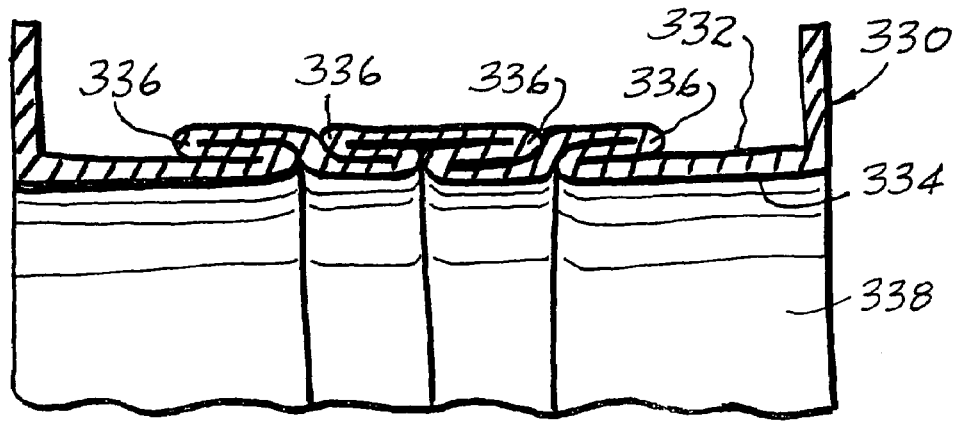
FIG. 8 is a fragmentary longitudinal cross-sectional view of the component part, showing still another alternate construction.

In the embodiment illustrated in FIG. 7, another alternate valve member 230 having an outer surface 232 and an inner surface 234 is provided with a plurality of folds 236. Some of the folds 236 extend longitudinally along the valve member 230 and overlie the outer surface 232 of the valve member 230, essentially contiguous with the outer surface 232. Others of the folds 236, shown as folds 236A, are spaced laterally outwardly from outer surface 232 and overlie corresponding folds 236, contiguous with the corresponding folds 236 to minimize lateral dimensions. The construction of valve member 232 enables the accommodation of even larger diameters in the passage 238 relative to the longitudinal length of valve member 230, while allowing closing of the passage 238 without excessive tensile stresses induced in the wall 240 of the valve member 230.

In the embodiment illustrated in FIG. 6, still another alternate valve member 330 having an outer surface 332 and an inner surface 334 is provided with a plurality of folds 336. All of the folds 336 extend longitudinally along the valve member 330 and are arranged serially along the valve member 330 so that all of the folds 336 overlie the outer surface 332 of the valve member 330, essentially contiguous with the outer surface 332, with adjacent folds 336 being spaced longitudinally in close proximity to one another. The construction of valve member 332 enables the accommodation of still larger diameters in the passage 338, where space is available for the increased length of the valve member 330, as compared to valve member 230 described above, while maintaining a minimum diameter.

Figure 9:
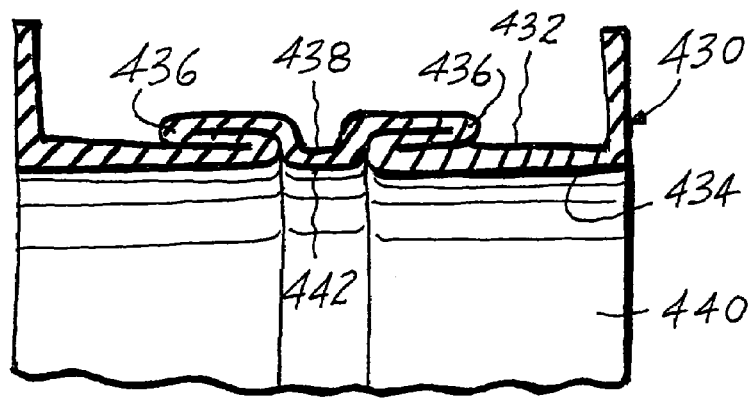
FIG. 9 is a fragmentary longitudinal cross-sectional view of the component part, showing yet another alternate construction.

In the embodiment illustrated in FIG. 9, yet another alternate valve member 430 having an outer surface 432 and an inner surface 434 is provided with folds 436 placed serially along the valve member 430 and overlying the outer surface 432, essentially contiguous with the outer surface 432. Folds 436 are spaced apart from one another longitudinally at 438 for facilitating operation of the valve member 430 in a manner similar to that described above; however, in order to avoid any deleterious effects on the flow of fluid through passage 440 of the valve member 430, such as turbulence in or impedance of the flow, a further wall portion 442 is interposed longitudinally between the folds 436 and is placed essentially contiguous with the folds 436 effectively to close any significant gap between the folds 436. Further wall portion 442 is contiguous with passage 440 and is essentially flush with inner surface 434 so as to avoid the aforesaid deleterious effects.

Figure 10:
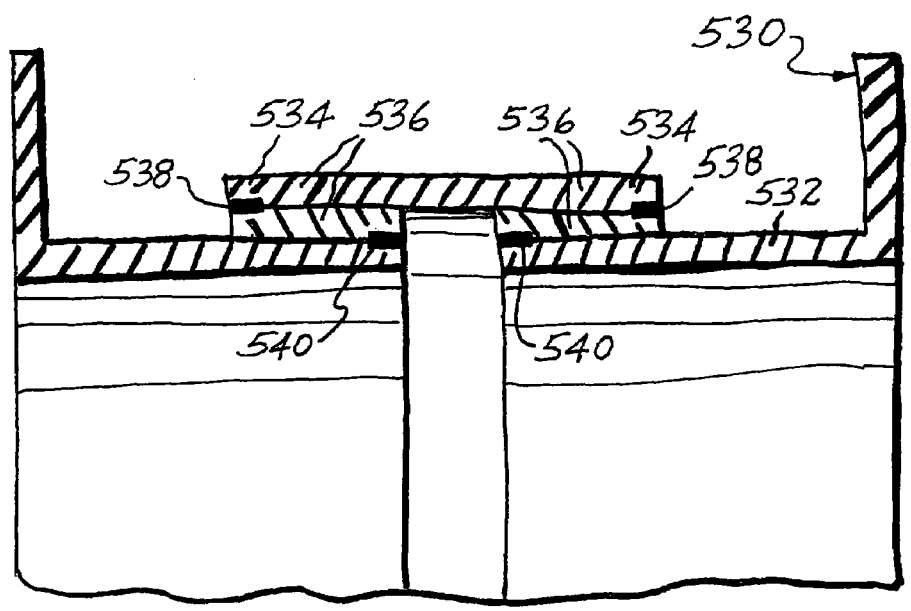
FIG. 10 is an enlarged fragmentary longitudinal cross-sectional view similar to FIGS. 6 through 9 and showing another alternate construction.

As indicated, each of the above-described valve members advantageously is molded or otherwise manufactured in a unitary construction. However, as shown in FIG. 10, a suitable valve member 530 may be constructed in the form of a tubular wall 532 having folds 534 with legs 536 integrated with one another by joining corresponding legs at 538 and integrated with the tubular wall 532 by joining corresponding legs at 540, as by adhesive bonding of an elastomeric material or by another of currently available joining methods.

It will be seen that the present invention attains the several objects and advantages summarized above; namely: Provides a pinch valve with a flexible tubular valve member having an effective wall length sufficient to enable closing of the valve member without introducing excessive tensile stresses into the wall of the valve member, while maintaining a minimal overall longitudinal length in the pinch valve itself; accomplishes the provision of sufficient length in a flexible tubular valve member of a pinch valve without introducing excessive turbulence in the flow of fluid through an open pinch valve; minimizes tensile stresses in the valve member of a pinch valve during operation to restrict flow through the valve member; enhances the ability to operate a pinch valve utilizing any one of a variety of valve operating mechanisms; provides a pinch valve with highly compact dimensions, both in longitudinal and lateral directions, enabling installation in systems having more severe size limitations; allows increased versatility and economy for the incorporation of pinch valves into systems heretofore not amenable to the employment of a pinch valve:; enables the manufacture of a wide range of highly versatile pinch valves with increased economy; provides pinch valves having a rugged construction capable of exemplary performance over a relatively long service life.

It is to be understood that the above detailed description of preferred embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. A pinch valve comprising:
   a valve casing extending longitudinally between opposite ends;
   a flexible tubular valve member within the valve casing, the valve member extending longitudinally between opposite ends such that each of the opposite ends of the valve member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent, and the wall extending circumferentially around the lateral extent of the passage;

at least one fold in the wall of the valve member, the fold, when in a folded configuration, including overlying legs extending along the tubular valve member in an essentially longitudinal direction so as to overlie the wall and have a prescribed longitudinal extent; and a valve operator for selectively exerting a lateral force upon the wall of the valve member to unfold the at least one fold and move the legs of the fold laterally, the relative dimensions of the longitudinal extent of the legs of the fold and the lateral extent of the passage enabling the unfolding of the at least one fold and the lateral movement of the legs of the fold to restrict the flow of fluid from one end to the other end of the valve member with only minimum forces upon the valve member in directions tending to establish tensile stresses in the valve member.

2. The pinch valve of claim 1 wherein the wall of the valve member includes an intermediate wall portion located intermediate the opposite ends of the valve member and the lateral force exerted by the valve operator is exerted at the intermediate wall portion to move the intermediate wall portion laterally.

3. The pinch valve of claim 1 wherein the at least one fold is unitary with the wall.

4. The pinch valve of claim 1 wherein the at least one fold is integral with the wall.

5. A pinch valve comprising:

a valve casing extending longitudinally between opposite ends;

a flexible tubular valve member within the valve casing, the valve member extending longitudinally between opposite ends such that each of the opposite ends of the valve member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent, and the wall extending circumferentially around the lateral extent of the passage;

at least one fold in the wall of the valve member, the fold when in a folded configuration, extending along the tubular valve member in an essentially longitudinal direction so as to overlie the wall and have a prescribed longitudinal extent; and a valve operator for selectively exerting a lateral force upon the wall of the valve member to unfold the at least one fold and move the wall laterally, the relative dimensions of the longitudinal extent of fold and the lateral extent of the passage enabling the unfolding of the at least one fold and the lateral movement of the wall to restrict the flow of fluid from one end to the other end of the valve member with only minimum forces upon the valve member in directions tending to establish tensile stresses in the valve member;

the valve member including an inner surface contiguous with the passage and an outer surface confronting the casing, and the at least one fold overlying the outer surface.

6. A pinch valve comprising:

a valve casing extending longitudinally between opposite ends;

a flexible tubular valve member within the valve casing, the valve member extending longitudinally between opposite ends such that each of the opposite ends of the valve member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent, and the wall extending circumferentially around the lateral extent of the passage;

at least two folds in the wall of the valve member, the folds, when in a folded configuration, each extending along the tubular valve member in an essentially longitudinal direction so as to overlie the wall and have a prescribed longitudinal extent; and a valve operator for selectively exerting a lateral force upon the wall of the valve member to unfold the folds and move the wall laterally, the relative dimensions of the longitudinal extent of the folds and the lateral extent of the passage enabling the unfolding of the folds and the lateral movement of the wall to restrict the flow of fluid from one end to the other end of the valve member with only minimum forces upon the valve member in directions tending to establish tensile stresses in the valve member;

the wall of the valve member including an intermediate wall portion located intermediate the opposite ends of the valve member, the lateral force exerted by the valve operator being exerted at the intermediate wall portion to move the intermediate wall portion laterally, and the at least two folds extending serially along the intermediate wall portion.

7. The pinch valve of claim 6 wherein the valve member includes an inner surface contiguous with the passage and an outer surface confronting the casing, and the at least two folds overlie the outer surface.

8. The pinch valve of claim 7 wherein the at least two folds are essentially contiguous with one another along the essentially longitudinal direction.

9. The pinch valve of claim 7 wherein the at least two folds are spaced from one another, closely adjacent one another, along the essentially longitudinal direction.

10. A pinch valve comprising:

a valve casing extending longitudinally between opposite ends; a flexible tubular valve member within the valve casing, the valve member extending longitudinally between opposite ends such that each of the opposite ends of the valve member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage the passage including a prescribed lateral extent, and the wall extending circumferentially around the lateral extent of the passage;

a plurality of folds in the wall of the valve member, the folds, when in a folded configuration, each extending along the tubular valve member in an essentially longitudinal direction so as to overlie the wall and have a prescribed longitudinal extent; and a valve operator for selectively exerting a lateral force upon the wall of the valve member to unfold the folds and move the wall laterally, the relative dimensions of the longitudinal extent of the folds and the lateral extent of the passage enabling the unfolding of the folds and the lateral movement of the wall to restrict the flow of fluid from one end to the other end of the valve member with only minimum forces upon the valve member in directions tending to establish tensile stresses in the valve member;

the wall of the valve member including an intermediate wall portion located intermediate the opposite ends of the valve member, the lateral force exerted by the valve operator being exerted at the intermediate wall portion to move the intermediate wall portion laterally, and the plurality of folds extending along the intermediate wall portion.

11. The pinch valve of claim 10 wherein the valve member includes an inner surface contiguous with the passage and an outer surface confronting the casing, and the plurality of folds overlie the outer surface.

12. The pinch valve of claim 11 wherein at least two of the plurality of folds overlie one another.

13. The pinch valve of claim 11 wherein the plurality of folds extend serially along the intermediate wall portion.

14. A pinch valve comprising:
a valve casing extending longitudinally between opposite ends;
a flexible tubular valve member within the valve casing, the valve member extending longitudinally between opposite ends such that each of the opposite ends of the valve member is juxtaposed with a corresponding opposite end of the casing;
the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent, and the wall extending circumferentially around the lateral extent of the passage;
at least one fold in the wall of the valve member, the fold, when in a folded configuration, extending along the tubular valve member in an essentially longitudinal direction so as to overlie the wall and have a prescribed longitudinal extent; and
a valve operator for selectively exerting a lateral force upon the wall of the valve member to unfold the at least one fold and move the wall laterally, the relative dimensions of the longitudinal extent of the fold and the lateral extent of the passage enabling the unfolding of the at least one fold and the lateral movement of the wall to restrict the flow of fluid from one and to the other end of the valve member with only minimum forces upon valve member in directions tending to establish tensile stresses in the valve member;
the at least one fold being constructed of a material having memory characteristics establishing biasing forces for biasing the fold into the folded configuration.

15. A pinch valve comprising:
a valve casing extending longitudinally between opposite ends;
a flexible tubular valve member within the valve casing, the valve member extending longitudinally between opposite ends such that each of the opposite ends of the valve member is juxtaposed with a corresponding opposite end of the casing;
the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage;
the valve member being folded essentially longitudinally upon itself to establish at least one folded portion including overlying legs, the folded portion having a longitudinal extent along the wall; and
a valve operator for selectively exerting a lateral force upon the wall of the valve member to unfold the folded portion of the valve member and move the legs of the folded portion laterally, the relative dimensions of the longitudinal extent of the folded portion and the lateral extent of the passage enabling the unfolding of the folded portion of the valve member and the lateral movement of the legs of the folded portion to restrict the flow of fluid from one end to the other end of the valve member with only minimal forces upon the valve member in directions tending to establish tensile stresses in the wall of the valve member.

16. The pinch valve of claim 15 wherein the wall of the valve member includes an intermediate wall portion located intermediate the opposite ends of the valve member and the lateral force exerted by the valve operator is exerted at the intermediate wall portion to move the intermediate wall portion laterally.

17. The pinch valve of claim 15 wherein the at least one folded portion is unitary with the wall.

18. The pinch valve of claim 15 wherein the at least one folded portion is integral with the wall.

19. A pinch valve comprising:
a valve casing extending longitudinally between opposite ends;
a flexible tubular valve member within the valve casing, the valve member extending longitudinally between opposite ends such that each of the opposite ends of the valve member in juxtaposed with a corresponding opposite end of the casing;
the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage;
the valve member being folded essentially longitudinally upon itself to establish at least one folded portion having a longitudinal extent along the wall; and
a valve operator for selectively exerting a lateral force upon the wall of the valve member to unfold the folded portion of the valve member and move the wall laterally, the relative dimensions of the longitudinal extent of the folded portion and the lateral extent of the passage enabling the unfolding of the valve member and the lateral movement of the wall to restrict the flow of fluid from one end to the other end of the valve member with only minimal forces upon the valve member in directions tending to establish tensile stresses in the wall of the valve member;

the valve member including an inner surface contiguous with the passage and an outer surface confronting the casing, and the at least one folded portion overlying the outer surface.

20. A pinch valve comprising:

a valve casing extending longitudinally between opposite ends;

a flexible tubular valve member within the valve casing, the valve member extending longitudinally between opposite ends such that each of the opposite ends of the valves member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage;

the valve member being folded essentially longitudinally upon itself to establish at least two folded portions each having a longitudinal extent along the wall;

a valve operator for selectively exerting a lateral force upon the wall of the valve member to unfold the folded portions of the valve member and move the wall laterally, the relative dimensions of the longitudinal extent of the folded portions and the lateral extent of the passage enabling the unfolding of the valve member and the lateral movement of the wall to restrict the flow of fluid from one end to the other end of the valve member with only minimal forces upon the valve member in direction tending to establish tensile stresses in the wall of the valve member;

the wall of the valve member including an intermediate wall portion located intermediate the opposite ends of the valve member, the lateral force exerted by the valve operator being exerted at the intermediate wall portion to move the intermediate wall portion laterally; and the at least two folded portions extending serially along the intermediate wall portion.

21. The pinch valve of claim 20 wherein the valve member includes an inner surface contiguous with the passage and an outer surface confronting the casing, and the at least two folded portions overlie the outer surface.

22. The pinch valve of claim 21 wherein the at least two folded portions are essentially contiguous with one another along the essentially longitudinal direction.

23. The pinch valve of claim 21 wherein the at least two folded portions are spaced from one another, closely adjacent one another, along the essentially longitudinal direction.

24. A pinch valve comprising:

a valve casing extending longitudinally between opposite ends;

a flexible tubular valve member within the valve casing, the valve member extending longitudinally between opposite ends such that each of the opposite ends of the valve member is juxtaposed with a corresponding opposite end of the casing;

the flexible tubular valve member having longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage and including an intermediate wall portion intermediate the opposite ends of the valve member;

the valve member being folded essentially longitudinally upon itself to establish a plurality of folded portions each having a longitudinal extent along the intermediate wall portion;

a valve operator for selectively exerting a lateral force upon the wall of the valve member to unfold the folded portions of the valve member and move the wall laterally, the relative dimension of the longitudinal extent of the folded portions and the lateral extent of the passage enabling the unfolding of the valve member and the lateral movement of the wall to restrict, the flow of fluid from one end to the other end of the valve member with only minimal forces upon the valve member in directions tending to establish tensile stresses in the wall of the valve member.

25. The pinch valve of claim 24 wherein the valve member includes an inner surface contiguous with the passage and an outer surface confronting the casing, and the plurality of folded portions overlie the outer surface.

26. The pinch valve of claim 25 wherein at least two of the plurality of folded portions overlie one another.

27. The pinch valve of claim 25 wherein the plurality of folded portions extend serially along the intermediate wall.

28. A pinch valve comprising:

a valve casing extending longitudinally between opposite ends;

a flexible tubular valve member within the valve casing, the valve member extending longitudinally between opposite ends such that each of the opposite ends of the valve member is juxtaposed with a corresponding opposite end of the casing;

the flexible tubular valve member having a longitudinal passage for conducting a fluid from one to the other of the opposite ends of the valve member, and a wall extending longitudinally between the opposite ends of the valve member and circumferentially around the passage, the passage including a prescribed lateral extent and the wall extending circumferentially around the lateral extent of the passage;

the valve member being folded essentially longitudinally upon itself to establish at least one folded portion having a longitudinal extent along the wall when in a folded configuration; and a valve operator for selectively exerting a lateral force upon the wall of the valve member to unfold the folded portion of the valve member and move the wall laterally, the relative dimensions of the longitudinal extent of the folded portion and the lateral extent of the passage enabling the unfolding of the valve member and the lateral movement of the wall to restrict the flow of fluid from one end to the other end of the valve member with only minimal forces upon the valve member in directions tending to establish tensile stresses in the wall of the valve members;

the at least one folded portion being constructed of a material having memory characteristics establishing biasing forces for biasing the folded portion into the folded configuration.

* * * * *